United States Patent
Hoferer et al.

(10) Patent No.: US 10,222,250 B2
(45) Date of Patent: Mar. 5, 2019

(54) COAXIAL PROBE HAVING A TENSIONED INTERNAL CONDUCTOR

(71) Applicant: VEGA Grieshaber KG, Wolfach (DE)

(72) Inventors: Christian Hoferer, Offenburg (DE); Florian Zimmermann, Bad Rippoldsau-Schapbach (DE)

(73) Assignee: VEGA GRIESHABER KG, Wolfach (DE)

( * ) Notice: Subject to any disclaimer, the term of this patent is extended or adjusted under 35 U.S.C. 154(b) by 363 days.

(21) Appl. No.: 15/031,120

(22) PCT Filed: Oct. 2, 2014

(86) PCT No.: PCT/EP2014/071115
§ 371 (c)(1),
(2) Date: Apr. 21, 2016

(87) PCT Pub. No.: WO2015/078618
PCT Pub. Date: Jun. 4, 2015

(65) Prior Publication Data
US 2016/0252385 A1  Sep. 1, 2016

(30) Foreign Application Priority Data
Nov. 27, 2013 (EP) .................................. 13194647

(51) Int. Cl.
*G01F 23/284* (2006.01)
(52) U.S. Cl.
CPC .................. *G01F 23/284* (2013.01)

(58) Field of Classification Search
None
See application file for complete search history.

(56) References Cited

U.S. PATENT DOCUMENTS

| 5,943,908 | A | 8/1999 | Innes et al. | |
| 7,012,437 | B2* | 3/2006 | Klofer | G01F 23/284 324/642 |
| 7,255,002 | B2* | 8/2007 | Gravel | G01F 23/284 73/290 R |
| 7,965,087 | B2* | 6/2011 | Reimelt | G01F 23/284 324/533 |
| 8,466,693 | B2 | 6/2013 | Osswald et al. | |
| 8,482,296 | B2* | 7/2013 | Reimelt | G01F 23/284 324/124 |
| 2005/0057264 | A1 | 3/2005 | Klofer | |

FOREIGN PATENT DOCUMENTS

| CN | 101194149 | 6/2008 |
| CN | 102197289 | 9/2011 |
| DE | 20 2008 006344 | 10/2008 |
| EP | 2 012 098 | 1/2009 |

* cited by examiner

Primary Examiner — Peter J Macchiarolo
Assistant Examiner — Jermaine L Jenkins
(74) Attorney, Agent, or Firm — Fay Kaplun & Marcin, LLP

(57) ABSTRACT

A coaxial probe is for a time-domain reflectometry fill level measurement device. The internal conductor of which is tensioned against the external conductor using a tension element. The tension element is in the form of a disc for example, and includes an internal thread which is screwed onto an external thread on the end of the internal conductor. Thus, the number of spacers can be reduced.

14 Claims, 4 Drawing Sheets

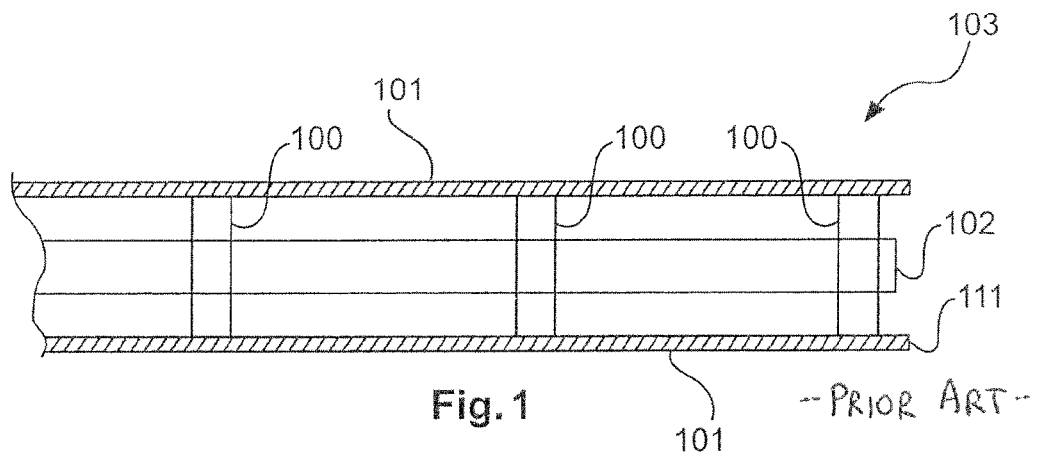
Fig. 1 —PRIOR ART—
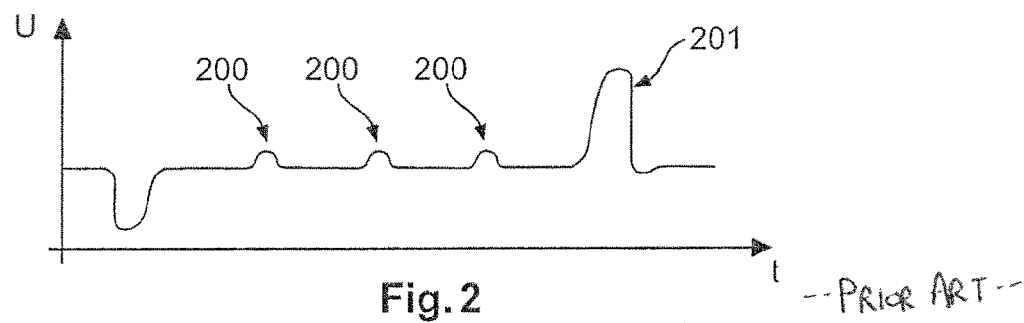
Fig. 2 —PRIOR ART—
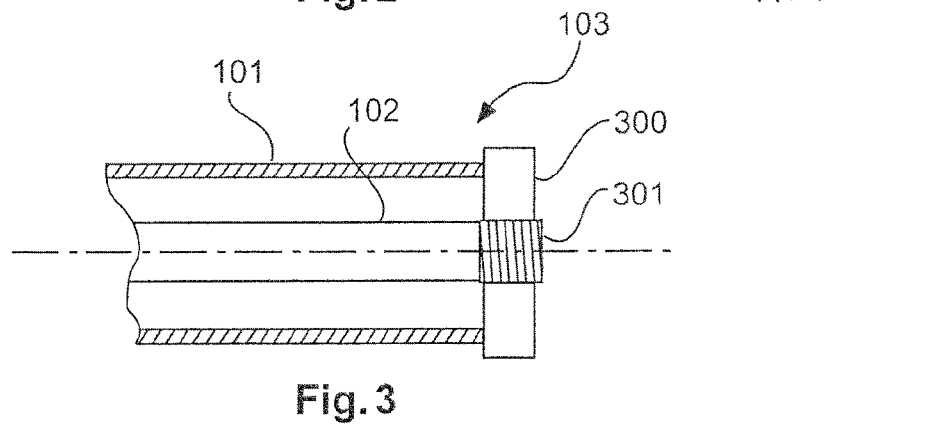
Fig. 3
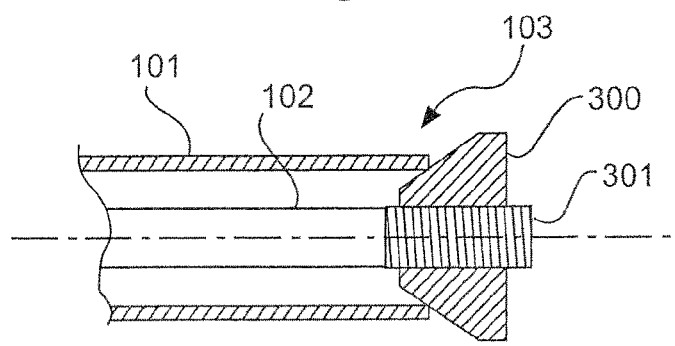
Fig. 4

COAXIAL PROBE HAVING A TENSIONED INTERNAL CONDUCTOR

FIELD OF THE INVENTION

The invention relates to time-domain reflectometry fill level measurement, also known by the term TDR fill level measurement. The invention relates in particular to a coaxial probe for a time-domain reflectometry fill level measurement device and to a fill level measurement device comprising a coaxial probe of this kind.

TECHNICAL BACKGROUND

TDR fill level measurement devices comprise coaxial probes which substantially consist of an external conductor and an internal conductor arranged concentrically therein. This elongate probe is immersed into the filling material, and a measurement signal is sent through the probe towards the filling material from the measurement electronics attached to the upper end of the coaxial probe. This measurement signal is reflected in particular at the filling material surface, and is returned to the top along the coaxial probe until it is then received by the measurement electronics.

The internal conductor is held and fixed by spacers so as to be spaced apart from the external conductor.

Each of the spacers causes both a transit time offset of the measurement signal, which leads to an offset between the measured value and the filling material surface, and a reflection of the transmission signal, which can impair the measurement accuracy.

SUMMARY OF THE INVENTION

A first aspect of the invention relates to a coaxial probe for a time-domain reflectometry fill level measurement device. The probe comprises an external conductor and an internal conductor which is arranged coaxially to the external conductor. In addition, a tension element is provided, which is attached to an end of the internal conductor in order to tension the internal conductor against the external conductor.

For example, the tension element pulls on the internal conductor and simultaneously pushes against the external conductor, in order to produce the tensioning.

Ideally, spacers can be completely omitted as a result, since the internal conductor is appropriately strongly tensioned against the external conductor and does not need to be fixed along its longitudinal extension. Fixings at the upper and lower end of the internal conductor are sufficient.

According to an embodiment of the invention, the tension element, the external conductor and the internal conductor interact in such a way that, after the internal conductor has been tensioned against the external conductor, the internal conductor can subsequently be retensioned again against the external conductor. This is advantageous in particular if the tensile force exerted by the tension element on the internal conductor decreases over time, for example because the internal conductor stretches.

Alternatively or in addition thereto, it can be provided in each of the embodiments described for the tensioning of the internal conductor against the external conductor to be brought about by the spring tension of a spring element. In this case, subsequent retensioning can also be omitted, at least if the length of the internal conductor changes only insignificantly.

According to an embodiment of the invention, the tension element is arranged at the lower end of the coaxial probe, wherein the lower end of the coaxial probe is the end that comes into contact first with the filling material when the coaxial probe is used as intended. The other, upper end of the coaxial probe is connected to the electronics of the fill level measurement device. Since the tensioning occurs at the lower end of the measuring probe, over the length of the probe, neither is the measurement accuracy substantially affected, as is the case when using spacers, nor is the measuring range of the probe restricted, as would be the case, for example, if there were a conductive connection at a point in the measuring range of the probe.

According to a further embodiment of the invention, the tension element comprises an internal thread, wherein the internal conductor comprises an external thread to which the internal thread of the tension element can be screwed in order to tension the internal conductor against the external conductor.

The lower end of the internal conductor can be solid and in the form of a pin for example, such as in the manner of a stud bolt.

According to a further embodiment of the invention, the tension element has a greater external diameter than the external conductor, so that said element strikes a lower edge of the external conductor when the internal conductor is tensioned against the external conductor. The external diameter of the tension element can also be slightly greater than the internal diameter of the external conductor. In this case, too, said tension element strikes the lower edge of the external conductor when the internal conductor is tensioned against the external conductor. For example, the tension element is flush with the external wall of the external conductor, i.e. has the same external diameter as the external conductor.

Said element can, for example, be welded to the external conductor and consist of the same material as the external conductor. It can also consist of insulating material. In this case, it is adhesively bonded to the external conductor for example.

According to an embodiment of the invention, the tension element has a circular cross section.

According to a further embodiment of the invention, the tension element is in the form of a disc. The discoid design of the tension element is simple and cost-effective to produce.

According to a further embodiment of the invention, the tension element comprises a conical region, which strikes against a lower edge of the external conductor when the internal conductor is tensioned against the external conductor, in order to centre the internal conductor.

It can also be provided for the tension element to comprise two cylindrical regions, wherein the first cylindrical region is arranged at the upper end of said tension element and has an external diameter that corresponds to the internal diameter of the external conductor. The second cylindrical region is arranged so as to adjoin said first cylindrical region, the external diameter of said second cylindrical region corresponding to the external diameter of the external conductor or at least being greater than the internal diameter of the external conductor.

The step formed between these two cylindrical regions supports the tension element against the external conductor when the internal conductor is tensioned against the external conductor.

According to a further embodiment of the invention, the tension element comprises a pin-like upper region having an external thread, wherein the internal conductor comprises an internal thread into which the pin-like upper region of the tension element can be screwed in order to tension the internal conductor against the external conductor.

It should be noted at this point that the tension element can be formed in one piece or, for example, formed of a plurality of pieces. In this case, the first piece supports the tension element against the external conductor, and a second piece is used to screw the tension element onto the internal conductor or into the internal conductor. In this case, the further parts are designed in the form of a bolt, a screw or a grub screw comprising a nut for example, which is guided through the first part.

According to a further embodiment of the invention, the tension element comprises a screw which can be screwed into an internal thread of the internal conductor in order to tension the internal conductor against the external conductor.

According to a further embodiment of the invention, the tension element comprises a central region from which one or more crosspieces extend outwards in order to support the tension element against the lower edge of the external conductor when the internal conductor is tensioned against the external conductor.

Four crosspieces may be provided for example, which pieces are arranged in the shape of a cross.

According to a further embodiment of the invention, the tension element comprises holes in order to permit fluid exchange or an exchange of the medium to be measured between the internal region of the external conductor and the surroundings of the external conductor.

According to a further aspect of the invention, a fill level measurement device is defined that has a coaxial probe as described above and below.

In the following, embodiments of the invention will be described with reference to the figures.

When, in the following description of the figures, the same reference numerals are used, they identify the same or similar elements. However, like or similar elements may also be denoted by different reference numerals.

BRIEF DESCRIPTION OF THE FIGURES

FIG. 1 is a cross section through a coaxial probe of a time-domain reflectometry fill level measurement device.

FIG. 2 shows a received signal recorded when using a probe of this kind.

FIG. 3 is a cross section of a lower region of a coaxial probe according to an embodiment of the invention.

FIG. 4 is a cross section of a lower region of a coaxial probe according to a further embodiment of the invention.

DETAILED DESCRIPTION OF EMBODIMENTS

Figure 10:
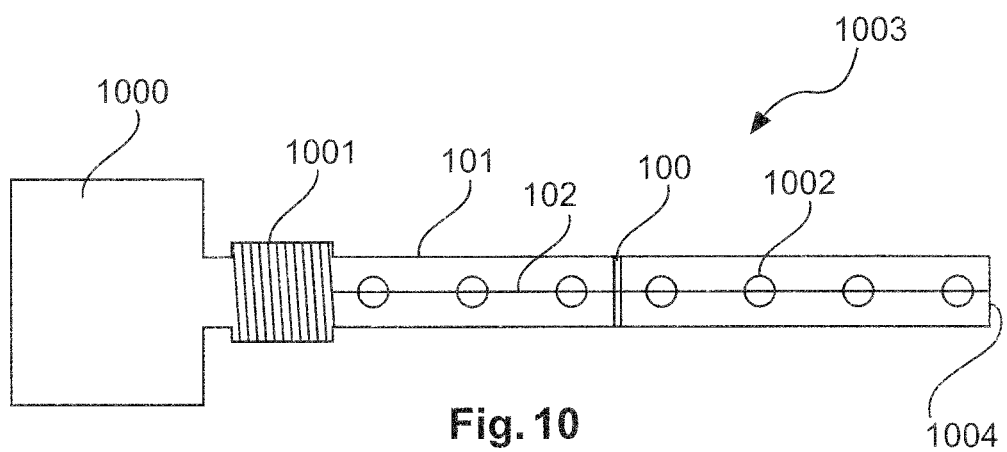
FIG. 10 shows a fill level measurement device comprising a coaxial probe according to an embodiment of the invention.

The present invention discloses a possibility for improving a fill level measurement by means of guided microwaves in conjunction with coaxial probes (TDR measurement). FIG. 10 shows a fill level measurement device comprising a corresponding coaxial probe. Coaxial probes for fill level measurement substantially consist of an external conductor 101 comprising holes 1002 and an internal conductor 102, in which, if required, the necessary spacing between the internal conductor and external conductor can be ensured mechanically by means of spacers 100. The probe end 1004 will also be referred to below as the lower end.

The coupling, having an option of being mounted in the container (e.g. by means of a screw-in thread 1001), and the housing comprising the electronics 1000 are located at the front end of the probe. In order to achieve the spacing between the internal conductor 102 and the external conductor 101 that is required for a measurement in the case of coaxial probes, and to also maintain said spacing under mechanical stress (vibrations, turbulence in the medium, for example due to an agitator), mechanical, non-conductive constructions, known as spacers 100, are attached at specific spacings in the coaxial conductor (see also FIG. 1).

The spacers prevent a short circuit between the internal and external conductors of the coaxial probe. A short circuit would significantly impair and distort the measurement. The number of spacers is designed such that the internal conductor 102 and the external conductor 101 are at a defined minimum spacing from each other. The accuracy of the measurement is influenced to a greater or lesser extent, depending on, for example, the material, shape, size or number of said spacers 100. In addition to a transit time offset, which leads to an offset between the measured value and the filling material surface, each of the spacers 100 also causes a reflection 200 of the transmission signal, which impairs the measurement accuracy (see FIG. 2).

The aim of this invention is to reduce to a minimum, and ideally to be able to entirely omit, the number of spacers 100 required hitherto by means of an appropriate construction of the probe.

Reducing the required spacers 100 is intended to be achieved by the two conductors (internal conductor 102 and external conductor 101) being tensioned against each other. The structure of the entire probe is made more stable because the two conductors exert opposing forces on each other along the probe. In addition, the internal conductor 102 cannot come as close to the external conductor 101 on account of the mutual tension. The aim of this is for fewer or no spacers 100 to be required over the entire length of the probe, which in turn is beneficial for the measurement accuracy.

Figure 5:
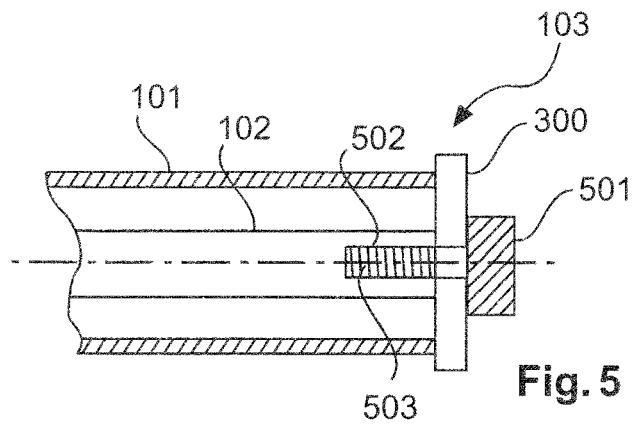
FIG. 5 is a cross section of a lower region of a coaxial probe according to a further embodiment of the invention.
Figure 6:
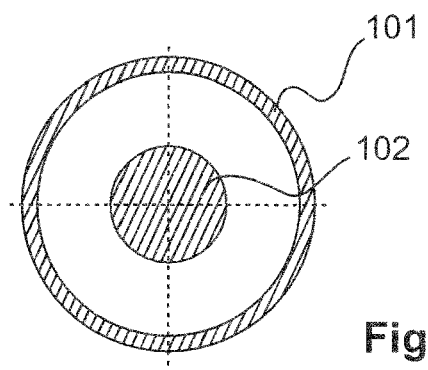
FIG. 6 is a cross section of a coaxial probe according to an embodiment of the invention.

According to FIG. 3-5, the tensioning occurs at the lower end of the measuring probe, since this does not restrict the measuring range.

It should be considered to be a main aspect of the invention that the coaxial probe which, according to the figures, is composed of the internal conductor and the external conductor and is used as a measuring probe for TDR measurements, is characterised in that the internal conductor and the external conductor are mechanically tensioned against each other and thus exert a force on each other in order that the internal conductor and the external conductor cannot touch the probe, even in the case of mechanical stress.

Various embodiments are provided in order to achieve the tensioning of the two conductors against each other.

The internal conductor 102 can for example be provided with a thread (301) on the end of the probe, onto which thread a corresponding mating part can be screwed, as shown in FIG. 3.

A type of nut 300 (conceivable having or without a snap ring/washer or the like) having a diameter greater than that of the external conductor 101 would be possible as the mating part for example, in order that said nut rests on the external conductor 101 when screwed onto the internal conductor 102, and thus produces the required tension on the internal conductor 102. A prerequisite for this is, of course, for both the external and the internal conductor to be rigidly connected to the coupling of the probe (process connection). According to the construction according to the invention, the internal and external conductor can only thus be tensioned against each other.

In place of a simple nut for screwing, a slightly conical shape of the corresponding mating part 300 would also be advantageous, in order for said mating part to reach slightly further into the external conductor (101) and in addition to centre the internal conductor (102) (see FIG. 4).

A further possibility for mutually tensioning the two conductors would be to provide the internal conductor 102 at the end of the probe with an internal thread 502 in the internal conductor 102, as shown in FIG. 5. A type of plate 300 can be provided as a suitable mating part for the external conductor 101, which plate creates, together with a screw 501 (which can be formed having or without a snap ring/washer or the like), the necessary tensile force between the two conductors. Here, too, a conical shape is possible for a mating part, as can be seen in FIG. 4.

Said plate 300 can be a part of the external conductor 101 itself (e.g. welded to the end), or can be fastened as an extra component, together with the screw 501.

It can be provided for the tension element, the external conductor and the internal conductor to interact in such a way that, after the internal conductor has been tensioned against the external conductor, the internal conductor can subsequently be retensioned again against the external conductor.

This can be achieved for example in that the internal conductor can be screwed slightly further into the tension element than is necessary for the initial pretensioning. Examples for this are shown in FIGS. 3 and 4, in which it is possible to see that the external thread of the internal conductor can be screwed still further into the tension element if subsequent retensioning should be required. As a development of the embodiment of FIG. 5, it can be provided for the internal conductor 102 not to strike the plate 300 of the tension element after being tensioned against the external conductor, meaning that subsequent retensioning is also possible in this case.

It can also be provided for the tensioning of the internal conductor against the external conductor to be brought about by the spring tension of a spring element. In this case, subsequent retensioning can be omitted, at least if the length of the internal conductor changes only insignificantly.

Figure 12:
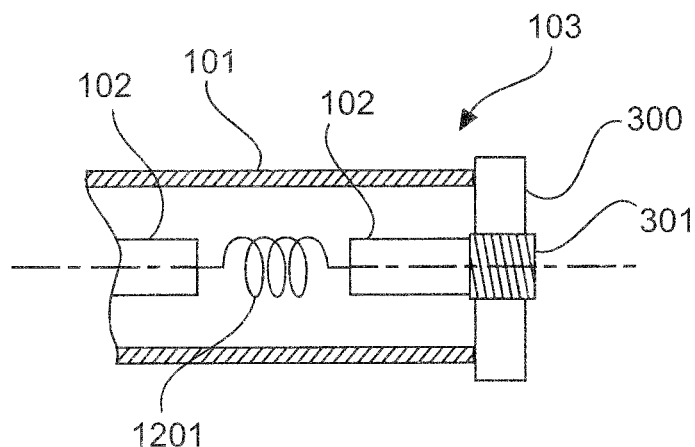
FIG. 12 shows the lower region of a coaxial probe according to a further embodiment of the invention.

The spring element can be attached at any desired point within the length of the coaxial conductor. The spring is arranged so as to exert tension on the internal conductor and compression on the external conductor. In the embodiment of FIG. 12, a spring element 1201 is attached at the lower end of the internal conductor 102. The internal conductor can be interrupted and the spring element attached between the two parts of the internal conductor. In this case, the spring element is tense and exerts a tension on the internal conductor.

Figure 13:
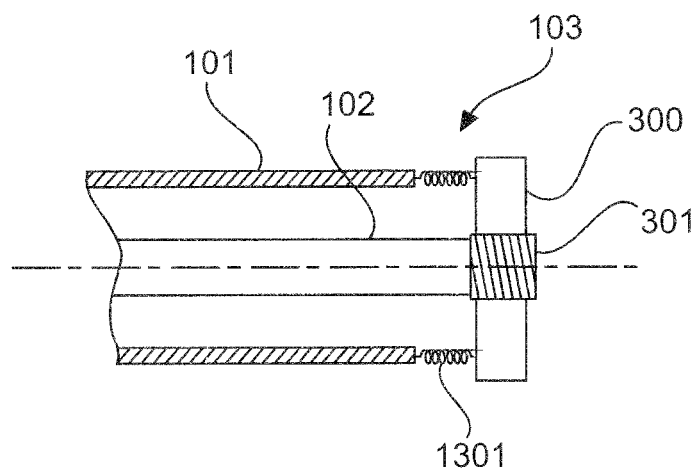
FIG. 13 shows the lower region of a coaxial probe according to a further embodiment of the invention.

In contrast thereto, a spring element can also be fastened on the external conductor 101 of the coaxial probe 103, as shown in FIG. 13. In this case, however, the spring element 1301 presses against the tension element 300. A plurality of spring elements of this kind can also be provided, which elements are arranged on the cross-sectional area of the external conductor (i.e. in a circular path).

In addition, both arrangements can be combined with each other, i.e. both tension spring elements and compression spring elements can be provided.

The tensioning of the conductors can be achieved in an electrically non-insulating manner, as a short circuit at the end of the probe, or in an insulating manner as an open end, since this would have no significant effect on determining the measured value, since in both cases the measuring range would be limited by the end of the coaxial probe.

Figure 8:
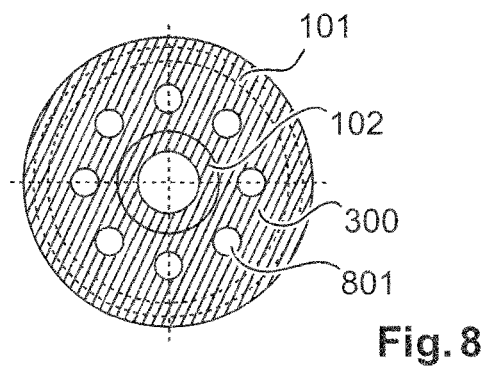
FIG. 8 shows the lower region of a coaxial probe according to a further embodiment of the invention.

In order that the fill level to be measured should be at the same level in the measuring tank and inside the measuring probe, the external conductor 101 has hitherto been provided with various holes (e.g. bores). In order to achieve this fill level adjustment all the way to the end of the probe, it is possible to also provide the connecting part (previously referred to as plate/mating part/nut) 300 between the internal conductor 102 and the external conductor 101 with holes 801 (e.g. in the form of bores), in order for the filling material to be able to pass the connecting part 300. This is shown in FIG. 8.

Figure 7:
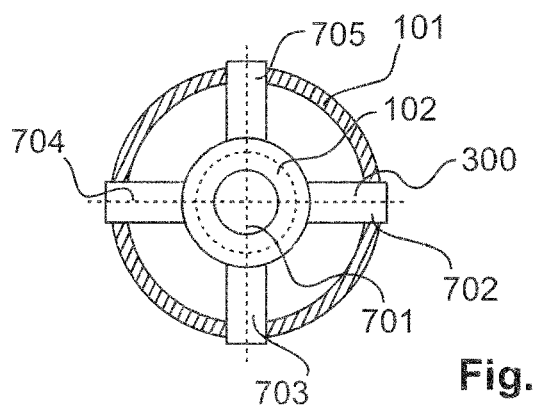
FIG. 7 shows the lower region of a coaxial probe according to a further embodiment of the invention.

Another possibility is to construct the connecting part 300 in other shapes, e.g. in the shape of a cross or star, having one or more crosspieces 702, 703, 704, 705, which for example extend outwards from a pin-like region 701 having an internal thread. This is shown in FIG. 7.

The star-shaped design allows an increased flow rate of the filling medium, since the crosspieces of the star can be formed so as to be very thin, for example by using a wire. If the crosspieces are designed having a circular cross section, it is very difficult for the filling medium to accumulate, which is a further advantage of the star shape.

Figure 14:
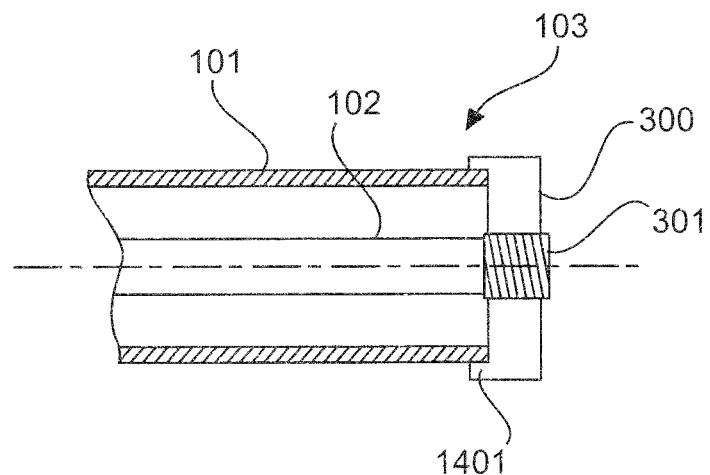
FIG. 14 shows the lower region of a coaxial probe according to a further embodiment of the invention.

FIG. 14 shows a further possibility for centring the internal conductor relative to the external conductor. In this case, the cover or the edge 1401 of the connecting part 300 is placed over the external conductor in an interlocking manner, and thus attaches both the connecting part and the internal conductor in a fixed position. In this case, the embodiment of the connecting part 300 can be of any desired shape (star, plate, etc.).

Figure 9:
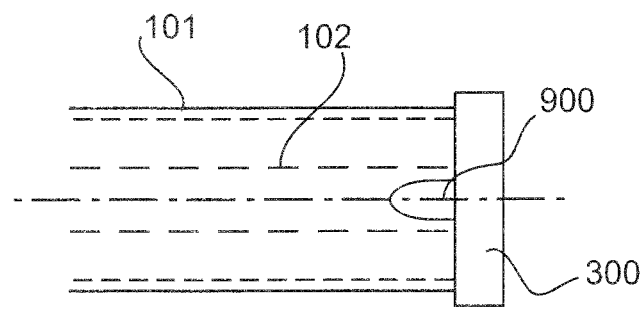
FIG. 9 shows the lower region of a coaxial probe according to a further embodiment of the invention.

A similar effect could be achieved by means of additional or extra holes 900, for example in the form of slits or bores, on the end of the external conductor 101 (see FIG. 9).

Figure 11:
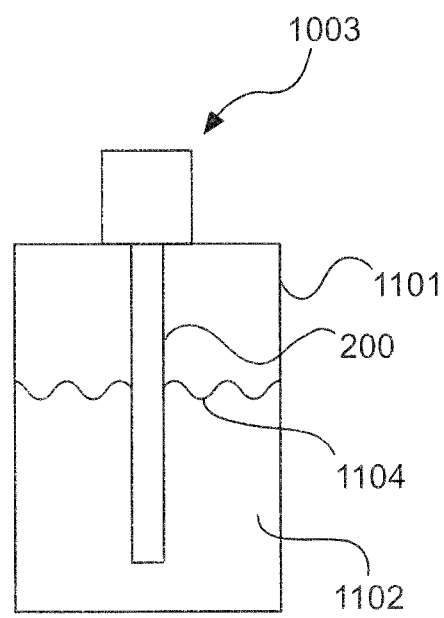
FIG. 11 shows a tank comprising a fill level measurement device according to an embodiment of the invention.

FIG. 11 shows a tank 1101 which comprises a filling material 1102 and in which a fill level measurement device 1003 according to an embodiment of the invention is attached. The fill level measurement device is used to determine the fill level 1104.

For the sake of completeness, it should be noted that "comprising" and "having" do not exclude the possibility of other elements or steps, and "one" or "a" does not exclude the possibility of a plurality. It should further be noted that features or steps which have been described with reference to one of the above embodiments may also be used in

The invention claimed is:

1. A coaxial probe for a time-domain reflectometry fill level measurement device, comprising:
   an external conductor;
   an internal conductor arranged so as to be coaxial to the external conductor;
   a tension element attached to an end of the internal conductor, the tension element tensioning the internal conductor against the external conductor; and
   a spring element attached to the internal conductor and configured to exert tension on the internal conductor and compression on the external conductor, or attached to the external conductor and configured to exert a pressing force on the tension element.

2. The coaxial probe according to claim 1, wherein the tension element is arranged at a lower end of the coaxial probe and wherein the lower end is an end that comes into contact first with a filling material when the coaxial probe is in an utilizing mode.

3. The coaxial probe according to claim 1, wherein the tension element includes an internal thread and wherein the internal conductor includes an external thread to which the internal thread of the tension element is configured to be screwed in order to tension the internal conductor against the external conductor.

4. The coaxial probe according to claim 1, wherein the tension element has a greater diameter than the external conductor so that the tension element strikes a lower edge of the external conductor when the internal conductor is tensioned against the external conductor.

5. The coaxial probe according to claim 1, wherein the tension element has a circular cross section.

6. The coaxial probe according to claim 1, wherein the tension element is in the form of a disc.

7. The coaxial probe according to claim 1, wherein the tension element includes a conical region, the conical region striking against a lower edge of the external conductor when the internal conductor is tensioned against the external conductor in order to center the internal conductor.

8. The coaxial probe according to claim 1, wherein the tension element includes a pin-like upper region having an external thread and wherein the internal conductor includes an internal thread, a pin-like upper region of the tension element configured to be screwed into the internal thread of the internal conductor in order to tension the internal conductor against the external conductor.

9. The coaxial probe according to claim 8, wherein the tension element includes a screw, the screw configured to be screwed into the internal thread of the internal conductor in order to tension the internal conductor against the external conductor.

10. The coaxial probe according to claim 1, wherein the tension element includes a central region and wherein one or more crosspieces extending from the central region outwards in order to support the tension element against the lower edge of the external conductor when the internal conductor is tensioned against the external conductor.

11. The coaxial probe according to claim 1, wherein the tension element includes holes, the holes permitting fluid exchange or an exchange of the medium to be measured between the internal region of the external conductor and the surroundings of the external conductor.

12. The coaxial probe according to claim 1, wherein the tension element includes a first and a second cylindrical region, wherein the first cylindrical region is arranged at an upper end of the tension element and has an external diameter that corresponds to the internal diameter of the external conductor, and wherein the second cylindrical region is arranged so as to adjoin the first cylindrical region, the external diameter of the second cylindrical region corresponding to or at least being greater than the internal diameter of the external conductor.

13. The coaxial probe according to claim 1, wherein the tension element, the external conductor and the internal conductor interact in such a way that, after the internal conductor has been tensioned against the external conductor, the internal conductor subsequently retensions against the external conductor.

14. A device measuring a fill level of a filling material, comprising:
   a coaxial probe according to claim 1.

* * * * *